United States Patent

Iso

[11] Patent Number: 5,920,839
[45] Date of Patent: *Jul. 6, 1999

[54] WORD RECOGNITION WITH HMM SPEECH, MODEL, USING FEATURE VECTOR PREDICTION FROM CURRENT FEATURE VECTOR AND STATE CONTROL VECTOR VALUES

[75] Inventor: Ken-Ichi Iso, Tokyo, Japan

[73] Assignee: NEC Corporation, Tokyo, Japan

[*] Notice: This patent is subject to a terminal disclaimer.

[21] Appl. No.: 08/797,888

[22] Filed: Feb. 10, 1997

Related U.S. Application Data

[63] Continuation of application No. 08/181,128, Jan. 13, 1994, abandoned.

[30] Foreign Application Priority Data

Jan. 13, 1993 [JP] Japan .................................. 5-003647

[51] Int. Cl.$^6$ .................................. G10L 9/14; G06T 1/40
[52] U.S. Cl. .................................. 704/256; 704/232
[58] Field of Search .................................. 395/2.6, 2.64, 395/2.65; 704/232, 251, 255, 256

[56] References Cited

U.S. PATENT DOCUMENTS

| | | | |
|---|---|---|---|
| 4,829,577 | 5/1989 | Kuroda et al. | 704/244 |
| 5,193,142 | 3/1993 | Zhao | 704/200 |
| 5,307,444 | 4/1994 | Tsuboka | 706/20 |
| 5,696,877 | 12/1997 | Iso | 704/232 |
| 5,737,486 | 4/1998 | Iso | 704/232 |

OTHER PUBLICATIONS

Ken–Ichi Iso, "Speech Recognition Using Dynamical Model of Speech Production," Proc. IEEE ICASSP '93, vol. II, pp. 283–286, Apr. 1993.

Andrew P. Sage and James L. Melsa, Estimation Theory with Applications to Communications and Control, McGraw–Hill, pp. 268–269, 1971.

Edward A. Patrick, Fundamentals of Pattern Recognition, Prentice–Hall, pp. 85–89, 1972.

Richard O. Duda and Peter E. Hart, Pattern Classification and Scene Analysis, Wiley–Interscience, pp. 59–66, 1973.

*Primary Examiner*—David R. Hudspeth
*Assistant Examiner*—Tālivaldis Ivars Šmits
*Attorney, Agent, or Firm*—Foley & Lardner

[57] ABSTRACT

A pattern recognition technology includes a set of control signal vector and covariance matrix for respective states of a reference pattern of an objective word for recognition, which reference pattern is expressed by a plurality of states and transitions between the states, and transition probabilities between respective states. A prediction vector of t th feature vector is derived on the basis of the t−1 th feature vector and the control signal vector for the current (n th) state, determined beforehand for each of the states. A feature vector output probability for outputting the t th feature vector in n th state of the reference pattern of the objective word for recognition is derived from multi-dimensional gaussian distribution determined by the prediction vector and the covariance matrix with taking the prediction vector as an average vector. A word output probability for the reference pattern of the objective word, outputting the feature vector sequence of the input signal employing the feature vector output probability and transition probabilities contained in respective states of the reference pattern, is derived. One of the word output probabilities having the maximum probability as a result of recognition of the word among all of the word output probabilities derived with respect to the objective word is output.

11 Claims, 6 Drawing Sheets

WORD RECOGNITION WITH HMM SPEECH, MODEL, USING FEATURE VECTOR PREDICTION FROM CURRENT FEATURE VECTOR AND STATE CONTROL VECTOR VALUES

This application is a Continuation of application Ser. No. 08/181,128, filed Jan. 13, 1994 abandoned.

BACKGROUND OF THE INVENTION

1. Field of the Invention

The present invention relates to a method and a system for automatically recognizing a pattern expressed in a time sequence of a feature vector, such as a voice signal.

2. Description of Related Art

Various technologies have been developed in pattern recognition systems for recognizing a time sequence pattern. Among the best established and frequently used methods is "Hidden Markov Models (HMM)". The principle of the HMM will be discussed hereinafter.

Assuming a word name is designated by a number w, the object for recognition can be a word set which can be expressed by:

$$\{w|w=1, 2, \ldots w\} \quad (1)$$

The reference pattern of each word can be expressed by a sequence of states. The nth state of the word w has a vector output probability distribution of Multi-Dimensional Gauss distribution $b_n^w(x)$ which is determined by the Set of Average Vector $\mu_n^w$ and the covariance matrix $$\sum_{n'}^{w} \left( \mu_{n'}^w, \sum_n^w \right) \quad (2)$$

$$b_n^w(x) = \frac{1}{\sqrt{2\pi^P \left|\sum_n^w\right|}} \exp\left[-(x - \mu_n^w)^\dagger \left(\sum_n^w\right)^{-1} (x - \mu_n^w)\right] \quad (3)$$

where P is a dimension of vector x and
$\mu_n^w$ is the Average Vector
$(\Sigma_n^w)^{-1}$ is the inverse matrix of covariance matrix of P rows and P columns
and
the superscript † represents transposition.

Figure 6:
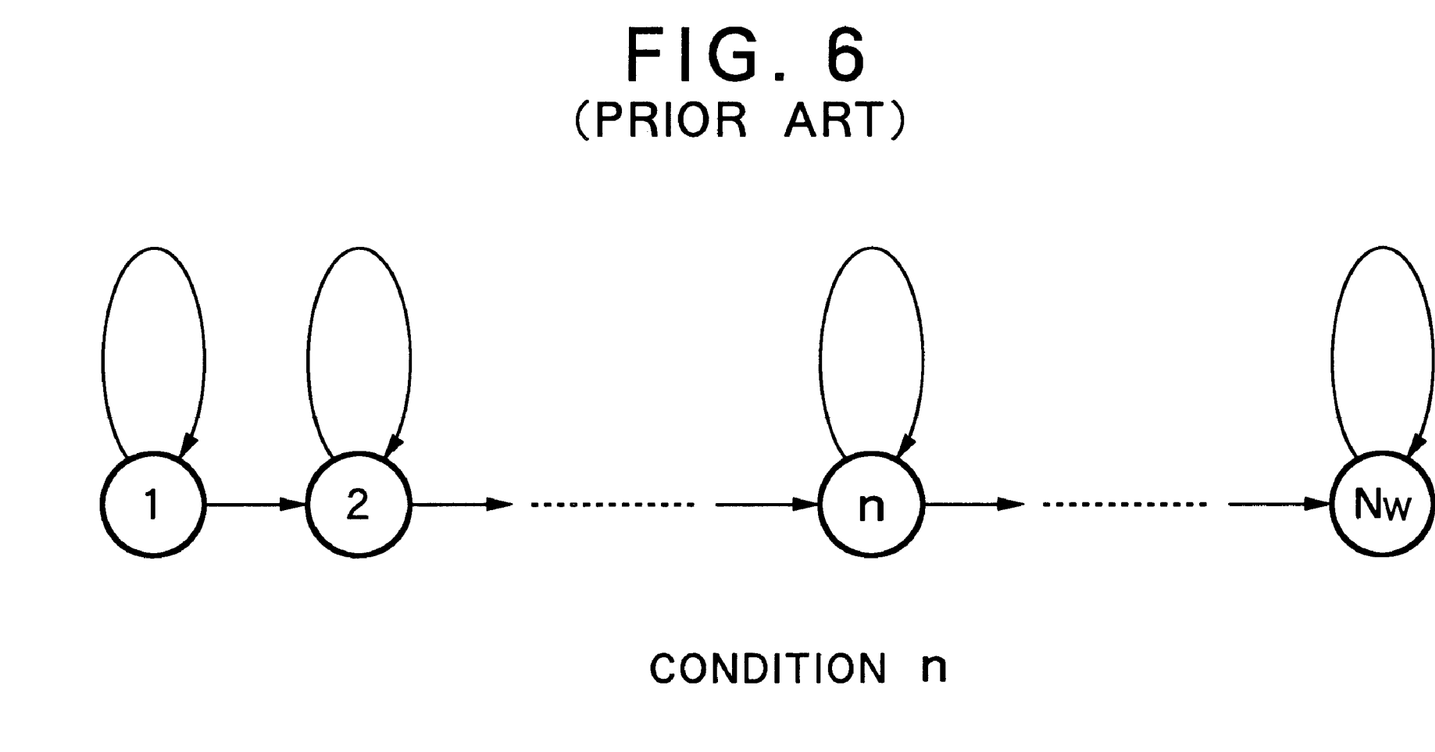
FIG. 6 is an illustration showing an example of a reference pattern of a state transition of a word.

To transition at respective states, transition probabilities are associated. An example (in the case that the number of states is $N_w$) of a reference pattern of a word is shown in FIG. 6. In FIG. 6, the nth state has a Transition probability of $a_{n,n}^w$ to itself and to an adjacent n+1th state having Transition probability=$a_{n,n+1}^w$.

The word output probability $(a_1, \ldots a_T, |w)$ of the reference pattern of the word w to output the feature vector sequence $a_1, \ldots a_T$ is defined by the following equation:

$$P(a_1, \ldots, a_T | W) = \sum_{n_1} \ldots \sum_{n_T} P(a_1, \ldots, a_T | n_1, \ldots, n_{T_1}, w) P(n_1, \ldots, n_T | W) \quad (4)$$

Figure 7:
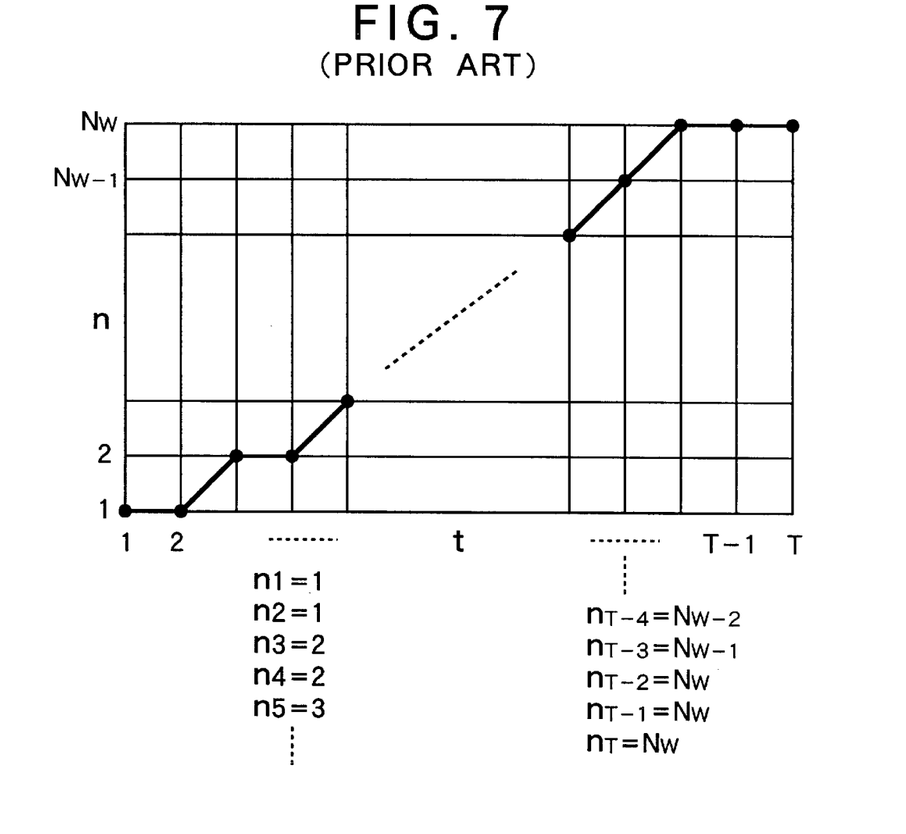
FIG. 7 is an illustration of a trellis for explaining the reference patter of a state transition of the word.

Here, $n_1, \ldots, n_T$ represents the transition of state which stays at $n_1$ at a time t=1, and reaches $n_T$ at a time t=T. In the foregoing equations, $\Sigma$ represents sums of all possible state transitions. The state transitions may be discussed on the trellis shown in FIG. 7. In FIG. 7, the horizontal axis corresponds to the feature vector and the vertical axis corresponds to the state sequence (see FIG. 6) of the reference pattern of the word. The state transitions are designated on the path (thick line) on the trellis and $n_1, \ldots, n_T$ express this in the above equation. $P(a_1, \ldots, a_T|n_1, \ldots, n_T, w)$ in equation (4) is the probability when a state transition is established, and $P(n_1, \ldots, n_T|w)$ is the probability of occurrence of the state transition. These probabilities are calculated from a vector output probability distribution and a transition probability as follows:

$$P(a_1, \ldots, a_T | n_2, \ldots, n_T, w) = \prod_{t=1}^{T} b_{nt}^{w}(a_t) \quad (5)$$

$$P(n_1, \ldots, n_T | W) = \prod_{t=1}^{T} a_{nt,nt+1}^{w} \quad (6)$$

The effective method of calculation of the word output probability $P(a_1, \ldots, a_T|w)$ given by equation (4) is known as the "forward calculation method". The "forward calculation method" has been discussed as a "forward algorithm" in the publication "Speech Recognition by Probability Model", page 42, algorithm 3.2, by Seiichi Nakagava, first published on Jul. 1, 1988 by Electronic Information Telecommunication Society. As a result, an accumulated probability $\alpha_t^w(n)$ to stay at the state n at a time t is initialised according to the following equation:

$$\alpha_1^w(n) = \begin{cases} b_1^w(a_1) & \text{if } n = 1 \\ 0 & \text{otherwise} \end{cases} \quad (7)$$

By performing calculation sequentially from a time 2 to time T according to the following equation:

$$\alpha_t^w(n) = \sum_{n=1}^{N} \alpha_{t-1}^w(m) a_{m,n}^w b_n^w(a_T) \quad (8)$$

the word output probability $P(a_1, \ldots, a_T|w)$ can be obtained as:

$$P(a_1, \ldots, a_T|W) = \alpha_T^w(N_w) \quad (9)$$

Also, the Viterbi calculation method, in which a sum of all possible state transitions is approximated to the extent of the state transition providing the maximum probability, has been discussed in the above-identified publication on page 46, algorithm 3.4. In the "Viterbi calculation method", the following equation is employed in place of the foregoing equation (4):

$$P(a_1, \ldots, a_T | W) = \max_{a_1} \ldots \max_{a_t} P(a_1, \ldots, a_T | n_1, \ldots, n_T, W) P(n_1, \ldots, n_T | W) \quad (10)$$

In this case, by modifying the calculation for deriving the maximum value of the sun in the equation (8) in the forward calculation method, (other variables are the same) the equation is:

$$\alpha_t^w(n) = \max_{m=1,\ldots,N} \alpha_{t-1}^w(m) a_{m,n}^w b_n^N(a_t) \quad (11)$$

By employing the "forward calculation method" or the "Viterbi calculation method", the reference pattern of the objective word for recognition can be calculated as a word output probability for outputting the feature vector sequence of the input signal. Then, recognition can be performed by selecting the word name having the maximum word output probability among all as the result of recognition.

Figure 8:
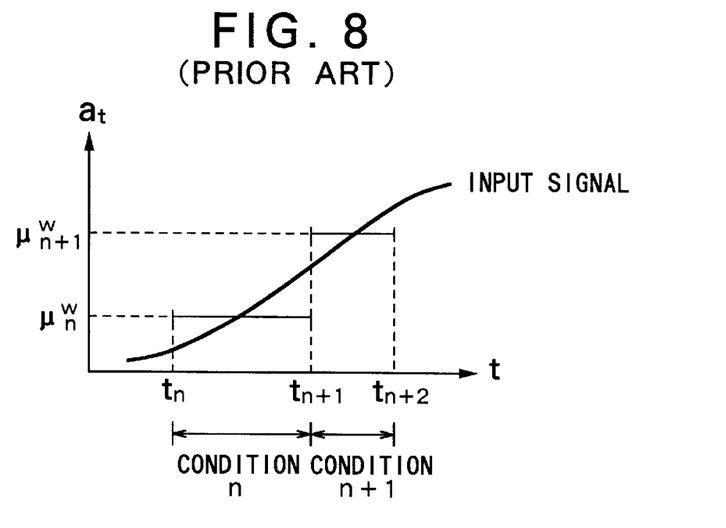
FIG. 8 is an illustration showing the manner of establishing a model by a gaussian distribution for $N_w$ sections in the case where the reference pattern of the word contains a sequence of $N_w$ states.

In the HMM method set forth above, the reference pattern of the word is expressed as the state sequence having multi-dimensional gaussian distribution. Namely, assuming that the reference pattern of the word w is the state sequence $N_w$ of states, the input is divided into $N_w$ sections so that each section is modeled by one gaussian distribution. This is illustrated in FIG. 8. In FIG. 8, the horizontal axis represents a time of the input signal and the vertical axis represents a value $a_t$ of the feature vector. Here, the dimension of the feature vector is illustrated by taking a single dimension. $\mu^w_n$ is an average vector of the gaussian distribution of the state n. $\mu^w_{n+1}$ represents the average vector of the gaussian distribution. In FIG. 8, by extracting such a state transition which stays at the state n from a time $t_n$ to time $t_{n+1}$ and at the state n+1 from the time $t_{n+1}$ to $t_{n+2}$, the manner of matching of the reference pattern and the input signal is illustrated. As is clear from FIG. 8, HMM approximates the input signal in the sections corresponding to respective states to the average value and the distribution therearound. For instance, the smoothly varying portion of the input signal from the time $t_n$ to $t_{n+1}$ is approximated by a constant average value $\mu^w_n$. In order to establish a model for a dynamically varying signal such as a voice signal, on the basis of a constant average value system (average vector) for each state, a large number of states are required. However, increasing the number of states results in increasing the number of parameters (average vectors of respective states and covariance matrix). Furthermore, in order to estimate the parameters with reliably high precision, a large amount of training data becomes necessary.

SUMMARY OF THE INVENTION

It is an object of the invention to provide a method and system for recognizing a pattern, which improves the defect in the HMM method to require a large number of parameters of models in order to establish a model with great precision in modeling a signal in a constant average value system for each state, and thus permits high precision modeling with a lessor number of parameters to realize a low cost and high performance pattern recognition system.

In order to accomplish the above-mentioned object, a pattern recognition method, according to one aspect of the invention, comprises the steps of:

providing a met of control signal vectors and a covariance matrix having respective states of a reference pattern of an object word for recognition, which reference pattern is expressed by a plurality of states and transitions between the states, and transition probabilities between respective states;

deriving a prediction vector of a t th feature vector on the basis of the t−1 th feature vector and the control signal vector;

deriving a feature vector output probability for outputting the t th feature vector in an n th state of the reference pattern of the objective word for recognition from multi-dimensional gaussian distribution determined by the prediction vector and the covariant matrix by taking the prediction vector as an average vector;

deriving a word output probability for the reference pattern of the objective word for recognition, outputting the feature vector sequence of the input signal employing the feature vector output probability and transition probabilities contained in respective states of the reference pattern; and outputting one of the word output probabilities having the maximum probability as a result of recognition of the word among all of the word output probabilities derived with respect to the objective word for recognition.

Preferably, the length of the reference pattern of length $N_w$ of the objective word for recognition is the sequence of $N_w$ words, when the n th state of the reference pattern has the control signal vector $c^w_n$, the prediction vector $\hat{a}_t^w(n)$ is derived as $\hat{a}_t^w = f(a_{t-1}, c_t^w)$ from the function $f(\cdot)$ from P+Q dimension to P dimension, assuming the dimension of the feature vector is P and the dimension of the control signal vector is Q, employing the t−1-th feature vector $a_{t-1}$.

According to another aspect of the invention, a pattern recognition system comprises:

a reference pattern storage portion for storing a set of control signal vectors and a covariant matrix having respective states of a reference pattern of an objective word for recognition, which reference pattern is expressed by a plurality of states and transitions between the states, and transition probabilities between respective states;

a prediction vector deriving portion for deriving a prediction vector of a t th feature vector on the basis of the t−1 th feature vector and the control signal vector;

a feature vector output probability deriving portion for deriving a feature output probability for outputting the t th feature vector in an n th state of the reference pattern of the objective word for recognition from multi-dimensional gaussian distribution determined by the prediction vector and the covariant matrix by taking the prediction vector as an average vector;

a word output probability deriving portion for deriving a word output probability for the reference pattern of the objective word for recognition, outputting the feature vector sequence of the input signal employing the feature vector output probability and transition probabilities contained in respective states of the reference pattern; and a recognition result outputting portion for outputting one of the word output probabilities having the maximum probability as a result of recognition of the word among all of the word output probabilities derived with respect to the objective word for recognition.

The pattern recognition system may further comprise:

a feature extracting portion for transforming the input signal into a feature vector sequence; and a feature vector storage portion for storing the feature vector.

The predicted vector deriving portion may perform such an operation that, when the length of the reference pattern of length $N_w$ of the objective word for recognition is the sequence of $N_w$ words, and when the n th state of the reference pattern has the control signal vector $c^w_n$, the prediction vector $\hat{a}_t^w(n)$ is derived as $\hat{a}^w_t = f(a_{t-1}, c^w_t)$ from the function $f(\cdot)$ from P+Q dimension to P dimension, assuming the dimension of the feature vector is P and the dimension of the control signal vector is Q, employing the t−1 th feature vector $a_{t-1}$.

BRIEF DESCRIPTION OF THE DRAWINGS

The present invention will be understood more fully from the detailed description given herebelow and from the accompanying drawings of the preferred embodiment of the invention, which, however, should not be taken to limit the invention, but, are for explanation and understanding only.

In the drawings.

DETAILED DESCRIPTION OF PREFERRED EMBODIMENT

The preferred embodiment of a method and a system for recognizing a pattern according to the present invention will be discussed in detail with reference to the accompanying drawings.

The feature of the pattern recognition method according to the present invention is that an average vector of a multi-dimensional gaussian distribution at each state of the reference pattern in the above-mentioned HMM method is not taken as a constant. A predicted vector which is calculated by a predictor on the basis of a feature vector of an input signal at one preceding period is employed so that a dynamically varying input signal, such as a voice signal, can be expressed effectively with fewer parameters.

In the case of the HMM method, the length of the reference pattern of length $N_w$ of the word w is a sequence of $N_w$ states. The n th state contains a multi-dimensional gaussian distribution $b^w_n(X)$ determined by a combination of an average vector $\mu^w_n$ and covariance matrix:

$$\Sigma^w_n, (\mu^w_n, \Sigma^w_n) \quad (12)$$

as vector output probability distribution.

The multi-dimensional gaussian distribution is:

$$b_n^w(x) = \frac{1}{\sqrt{2\pi^P \left|\sum_n^w\right|}} \exp\left[-(x - \mu_n^w)^\dagger \left(\sum_n^w\right)^{-1} (x - \mu_n^w)\right] \quad (13)$$

In the case of the present invention, the length of the reference pattern of length $N_w$ of the word w is $N_w$ states. The n th state contains a combination of a control signal vector $c^w_n$ and covariance matrix $\Sigma^w_n, (\mu^w_n, \Sigma^w_n)$. The vector output probability that the n th state outputs the t th feature vector of the input signal can be calculated from the following multi-dimensional gaussian distribution:

$$b_n^w(a_t) = \frac{1}{\sqrt{2\pi^P \left|\sum_n^w\right|}} \exp\left[-(a_t - \hat{a}_t^w(n))^\dagger \left(\sum_n^w\right)^{-1} (a_t - \hat{a}_t^w(n))\right] \quad (14)$$

Employing this vector output probability distribution, the word output probability is calculated from the foregoing equation (4).

Here, what is different from the conventional HMM method is that the average vector of the gaussian distribution is not $\mu^w_n$ an a constant but is a prediction vector $\hat{a}^w_t(n)$. The prediction vector is calculated by a predictor $f(\cdot)$ using the control vector $c^w_n$ having the n th state and the t−1 th feature vector $a_{t-1}$ of the input signal:

$$\hat{a}_t^w(n) = f(a_{t-1}, c_n^w) \quad (15)$$

Figure 1:
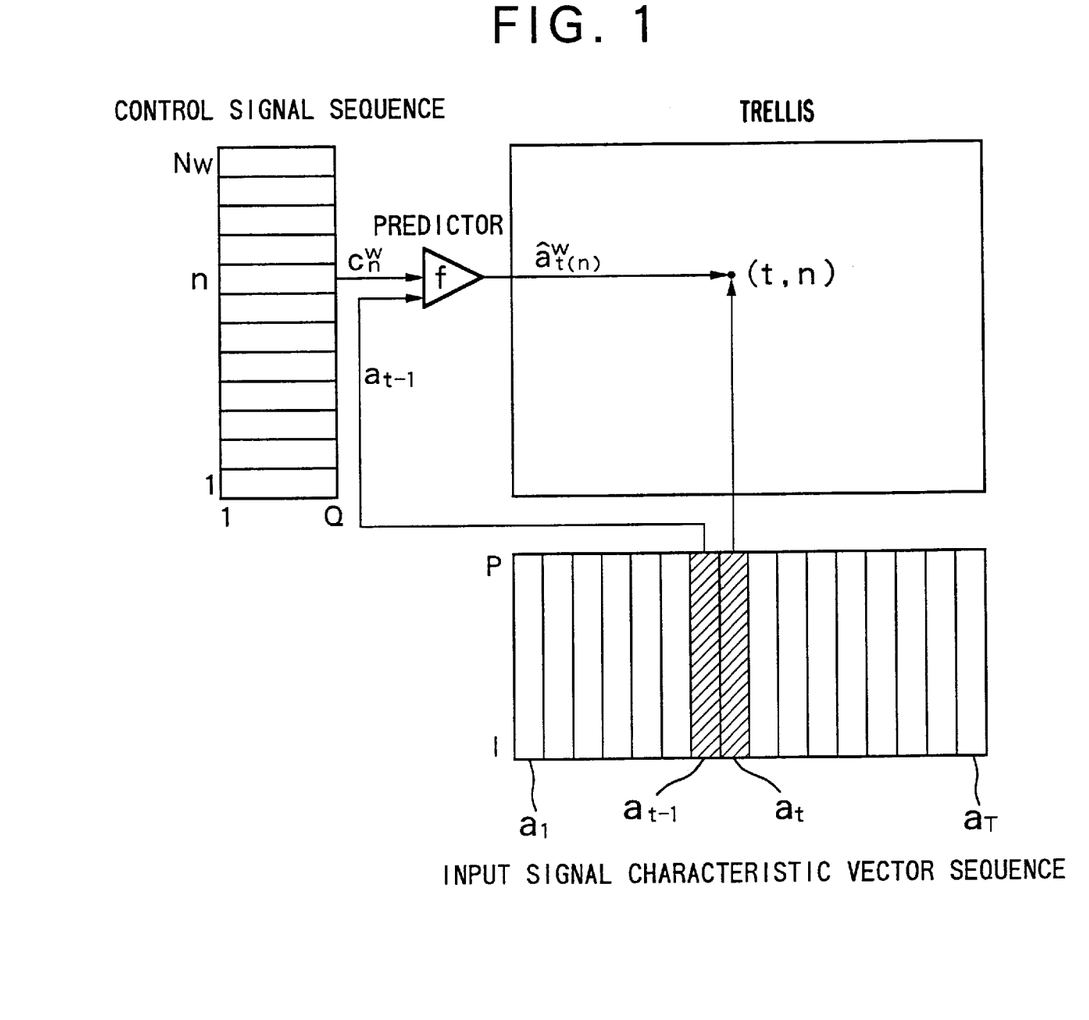
FIG. 1 is an explanatory illustration showing the principle of a pattern recognition method according to the present invention.

Here, the function f is a function from P+Q dimension to P dimension, assuming that the dimension of the feature vector is P dimension and the dimension of the control vector is Q dimension. The function $f(\cdot)$ can be regarded as a predictor predicting the feature vector at a time t from the feature vector at a time t−1. The manner of prediction will be discussed with reference to FIG. 1. FIG. 1 diagrammatically illustrates matching of the feature vector sequence $a_1, \ldots a_t, \ldots a_T$ of the input signal of length T and $N_w$ length of the reference pattern, which corresponds to the trellis (FIG. 7) of the HMM method. Here, at the grid point (t, n) on the trellis designated by the time t of the input signal and the state n of the reference pattern, the prediction vector $\hat{a}_t(n)$ is calculated as the average vector of the multi-dimensional gaussian distribution employing the predictor $f(\cdot)$ in order to calculate the vector output probability $b^w_n(a_t)$. As can be seen from the drawing, the control signal vector $c^w_n$ having the n th state and the feature vector $a_{t-1}$ of the input signal at one preceding period are employed for calculation of the prediction vector.

Figure 2:
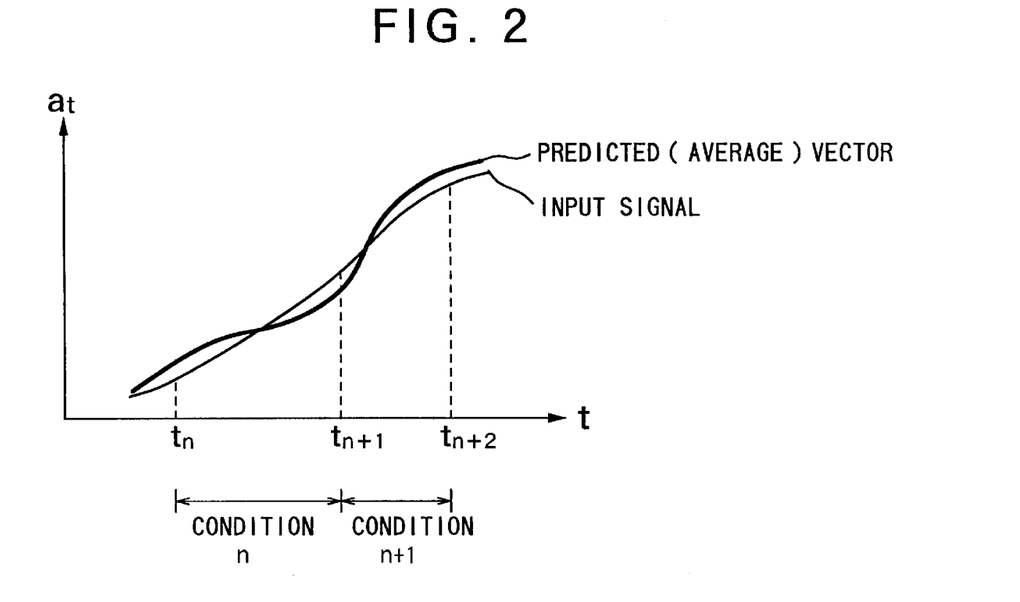
FIG. 2 is an explanatory illustration showing the principle of a pattern recognition method according to the present invention.

As set forth, according to the present invention, the average vector $\mu^w_n$ of the gaussian distribution of the n th state is replaced with the prediction vector $\hat{a}_t^w(n)$ depending upon the input signal from time to time. Therefore, the problem caused in expressing the dynamic variation of the input signal with the average vector as pointed out in the HMM method, can be solved, and thus the reference pattern matching the input voice with high precision can be provided by employing the average vector which varies dynamically following the input signal. This is illustrated in FIG. 2 for comparison with FIG. 8. As is clear from the comparison of these figures, the present invention is superior to the prior art.

Next, further discussion will be given for the predictor $f(\cdot)$ employed in the present invention. The predictor, taking K and Q as vectors in the P dimension and y as a vector in the Q dimension, is expressed by:

$$z = f(x, y) \quad (16)$$

Various functions may be considered as function from the P+Q dimension to P dimension.

As a linear functions a matrix can be employed:

$$Z_i = \sum_{j=1}^{P} F_{ij} x_j + \sum_{j=1}^{Q} G_{ij} Y_i + H_i \qquad (17)$$

Here, $z_i$, $x_i$ and $y_j$ represent components of the vector. The predictor is expressed by a matrix $F_{ij}$ of P rows and P columns, a matrix $G_{ij}$ of P rows and Q columns, and a vector $H_i$ in the P dimension. The number of parameters in the predictor is P(P+Q+1).

Figure 3:
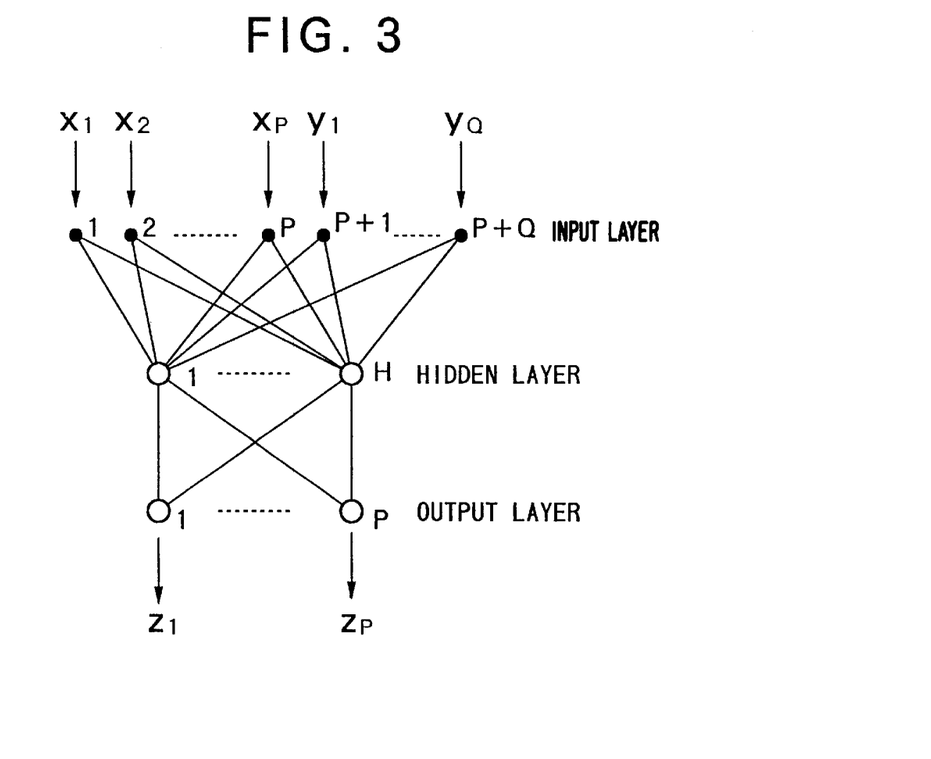
FIG. 3 is an explanatory illustration showing the principle of a pattern recognition method according to the present invention.

As a non-linear function, a hierarchical neural network has P+Q input units and P output units. The hierarchical neural network has been discussed in detail in Kideki Aso, "Neural Network Information Processing", Sangyo Tosho. The construction in the case where a three layer network having H hidden units is employed, is shown in FIG. 3. The parameter of the predictor is (P+Q)H coupling coefficients from the input layer to the hidden layer, H threshold values of the hidden layer, HP coupling coefficients from the hidden layer to the output layer, and P threshold values of the input layer.

The predictor employed in the present invention is realized as the linear or non-linear function as set forth above. The same predictor is applicable for all states of reference patterns of all possible objective words for recognition. In each state of a reference pattern of each objective word for recognition, different is prediction (average) vectors $â^w_t$ are output from the same feature vector $a_{t-1}$ depending upon the word or state when the predictor is using mutually different control signals.

Figure 4:
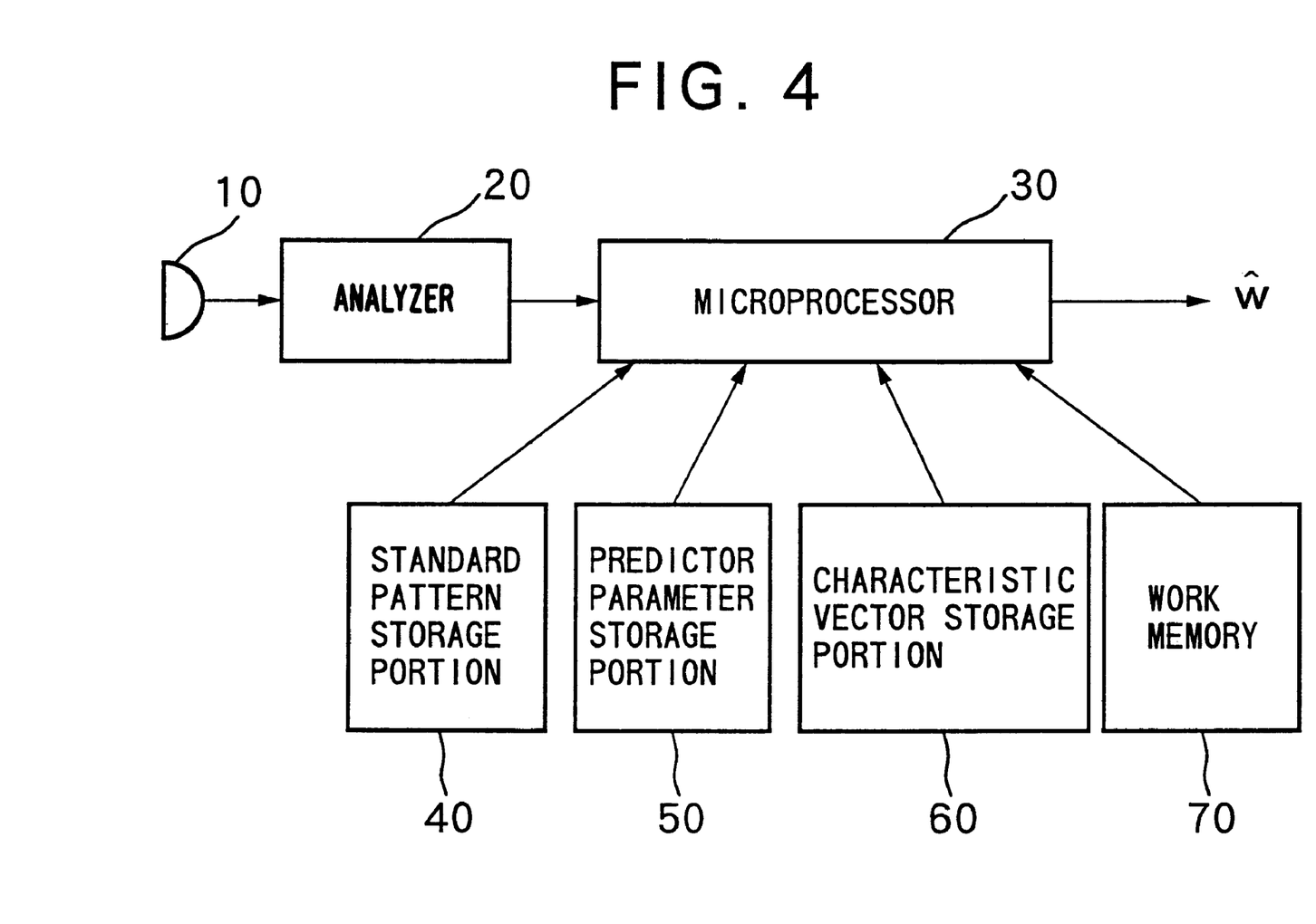
FIG. 4 is a block diagram showing one embodiment of a pattern recognition system according to the present invention.

FIG. 4 shows one embodiment of the pattern recognition system to which the pattern recognition method of the present invention is applied. A voice signal input from a microphone 10 is sampled and modeled by an analyzing portion 20 and fed to a microprocessor 30 with transformation into the feature vector $a_t$ by a fast Fourier transformation or so forth. Connected to the microprocessor 30, as memories, are a reference pattern storage portion 40, a predictor parameter storage portion 50, a feature vector storage portion 60 and a work memory 70.

In the reference pattern storage portion 40, a sequence (note, n=1, . . . , $N_w$) of the control signal vector $c^w_n$ and covariance matrix $\Sigma^w_n$ and a transition probability $a^w_{m,n}$ (m, n=1, . . . , $N_w$) are stored as parameters of the reference pattern of each word w. In the predictor parameter storage portion 50 are stored parameters of the predictor (when the linear predictor is employed as the predictor, the parameters are $F_{ij}$, $G_i$, $H_j$). The feature vector storage portion 60 maintains the feature vector $a_{t-1}$ of one preceding period. The work memory is a work area for temporarily storing the vector output probability and the accumulated probability upon calculation of the word output probability according to the reference pattern of each objective word for recognition. The reference pattern storage portion 40, the predictor pattern storage portion 50, the feature vector storage portion 60 and the work memory 760 say be defined in a separated memory area in a main memory of the microprocessor 30.

The recognition process is executed by a program by the microprocessor 30. For the leading feature vector $a_1$ of the input signal, the following initialization is performed for each state of each of the objective words (w=1, . . . , W, . . . n=1, . . . , $N_w$, in which $N_w$ is the number of states of the reference pattern of the word w).

The equation:

$$a_1^W(n) = \begin{cases} b_1^W(a_1) & \text{if } n = 1 \\ 0 & \text{otherwise} \end{cases}$$

corresponds to the initial state of the equation (7) of the forward calculation method (or Viterbi calculation method). Also, the feature vector $a_t$ is stored in the feature vector storage portion 60.

Figure 5:
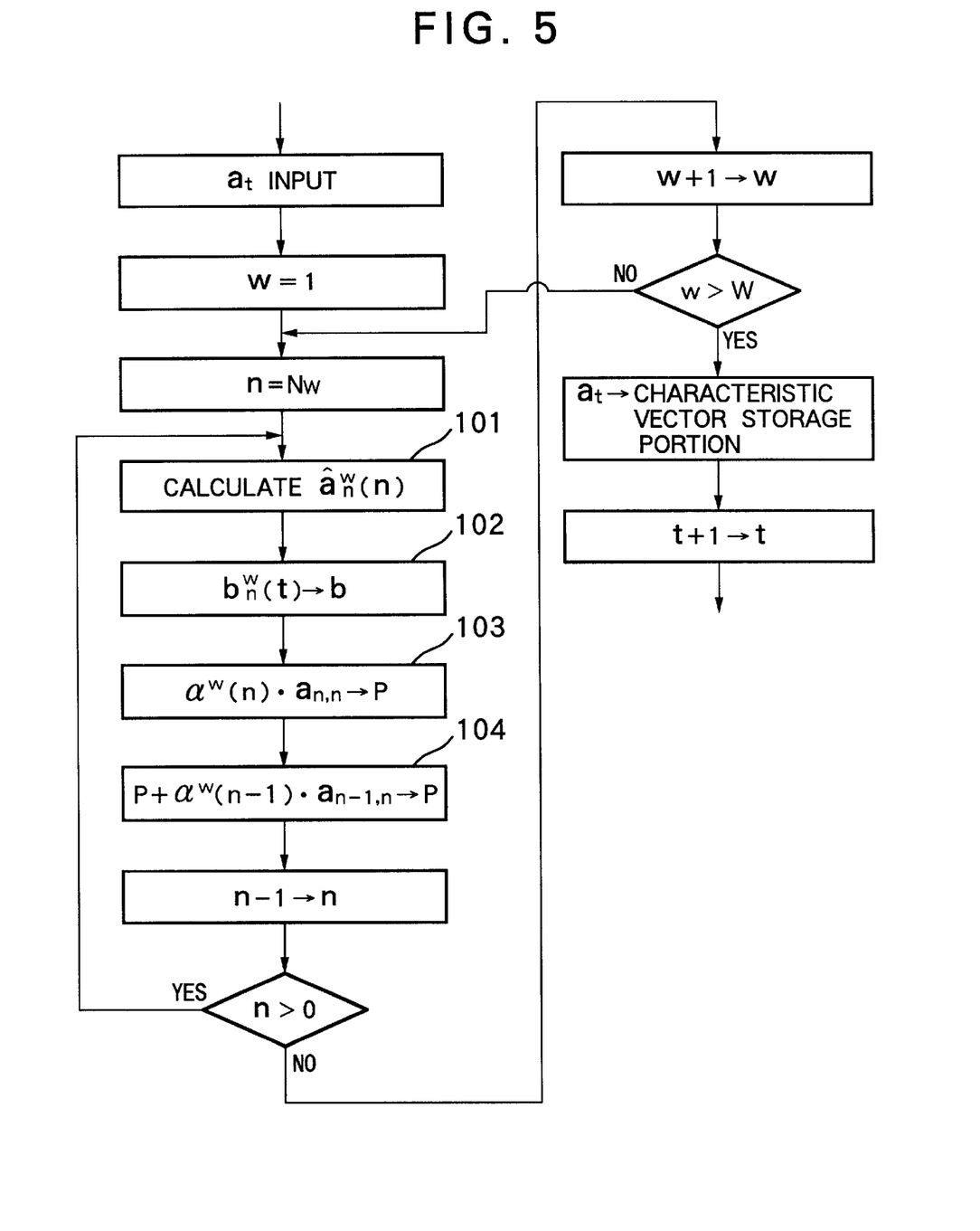
FIG. 5 is a flowchart showing the process of the pattern recognition system of FIG. 4.

Subsequently, at every occurrence of an input of the feature vector of the input signal, the process shown in the flowchart of FIG. 5 is executed by the microprocessor 30. In FIG. 5 of the drawings, 101 is a block for calculating the predicted vector by the equation (15) from the feature vector $a_{t-1}$ of one preceding period and the control signal vector $c^w_n$ stored in the reference pattern storage portion 40. By taking the predicted vector as the average vector, the vector output probability $b^w_n(t)$ is calculated according to the equation (14) in the block 102, and then stored as a variable b in the work memory 70. In the block 103, the accumulated probability $a^w(n)$ is multiplied by the transition probability $a^w_n$ read out from the reference pattern storage portion 40 and then stored in the work memory 70 as a variable P. In the block 104, the accumulated probability $a^w(n-1)$ read out from the work memory 70 is multiplied by the transition probability $a^w_{n-1,n}$ read out from the reference pattern storage portion 40. The process from the block 103 to the block 104 corresponds to the process according to the equation (8).

Once the above-mentioned processes are completed, the time of the input signal is incremented for one period. Then, the same process is performed in response to another feature vector $a_t$. After termination of the input signal and the final feature vector $a_T$ is processed, the microprocessor 30 internally performs the following processes. The accumulated probability $a^w(N_w)$ of each word stored in the work memory 70 provides the word output probability of the reference pattern of each word outputting the input signal. By comparing these sequentially, the maximum value is derived to output w=ŵ corresponding thereto as the result of recognition.

As set forth above, by modifying the prediction vector by the predictor from time to time depending upon the input signal instead of using the average vector of the gaussian distribution of the HMM method, a low cost and high performance pattern recognition system can be realized by establishing models of the signals with greater accuracy, with a lessor number of states and with a lesser number of parameters.

Although the invention has been illustrated and described with respect to an exemplary embodiment thereof, it should be understood by those skilled in the art that the foregoing and various other changes, omissions and additions nay be made therein and thereto, without departing from the spirit and scope of the present invention. Therefore, the present invention should not be understood as limited to the specific embodiment set out above but to include all possible embodiments which can be embodied within the scope encompassed and equivalents thereof with respect to the features set out in the appended claims.

What is claimed is:

1. A pattern recognition method for an input signal, comprising the steps of:
   a) storing a reference pattern as an objective word for recognition, the reference pattern having a plurality of states, storing a control signal vector determined beforehand for each of the plurality of states, storing a covariance matrix for each of the plurality of states, storing information concerning transitions between the states, and transition probabilities between the states;

b) deriving a prediction vector of a t th feature vector on the basis of a t−1 th feature vector and the control signal vector corresponding to a nth state of the reference pattern of the objective word;

c) deriving a feature vector output probability for the t th feature vector in the n th state of the reference pattern of the objective word from a multi-dimensional gaussian distribution determined by said prediction vector and said covariance matrix by using said prediction vector as an average vector;

d) deriving a word output probability for the reference pattern of the objective word, and outputting the probability of the most probable objective word corresponding to the input feature vector sequence employing the word output probability and the transition probabilities contained in respective states of the reference pattern; and e) outputting one objective word having a corresponding maximum word output probability as a result of recognition of the word on the basis of the word output probabilities obtained by repeating the steps a) through d) for a plurality of different objective words for recognition, wherein the one objective word corresponds to a pattern recognition output result for the input signal.

2. A pattern recognition method as set forth in claim 1, wherein a length of the reference pattern of a length $N_w$ of the objective word for recognition is a sequence of $N_w$ of states, when the n th state of said reference pattern has the control signal vector $c_n^w$, the prediction vector $â_t^w$ (n) is derived as $â_t^w = f(a_{t-1}, c_t^w)$ wherein a dimension of the feature vector is P, a dimension of the control signal vector is Q, and wherein the t−1 th feature vector is $a_{t-1}$.

3. A pattern recognition method as set forth in claim 1, wherein the prediction vector is derived on the basis of one of a linear function and a non-linear function of the t−1 th feature vector and the control signal vector corresponding to the nth state of the reference pattern of the objective word, the linear function being expressed as a matrix relationship, the non-linear function being expressed as a neural network.

4. A pattern recognition method as set forth in claim 3, wherein the non-linear function is expressed using the neural network as a hierarchical network having P+Q inputs and P outputs, P and Q being integers greater than one.

5. A pattern recognition method as set forth in claim 3, wherein the linear function is expressed as a matrix Fij of constants, i and j being integers greater than one, a matrix Gij of constants, and a vector Hi, wherein the linear function is expressed as Fij*xj+Gij*yi+Hi, wherein xj is the t−1 th feature vector and wherein yi is the control signal vector corresponding to the nth state of the reference pattern of the objective word.

6. A pattern recognition system for an input signal, comprising:

reference pattern storage means for storing a reference pattern as an objective word for recognition, the reference pattern having a plurality of states, storing a control signal vector determined beforehand for each of the plurality of states, storing a covariance matrix for each of the plurality of states, storing information concerning transitions between the states, and transition probabilities between the states;

prediction vector deriving means for deriving a prediction vector of a t th feature vector on the basis of a t−1 th feature vector and the control signal vector corresponding to a nth state of the reference pattern of the objective word;

feature vector output probability deriving means for deriving a feature vector output probability for the t th feature vector in the n th state of the reference pattern of the objective word from a multi-dimensional gaussian distribution determined by said prediction vector and said covariance matrix by using said prediction vector as an average vector;

word output probability deriving means for deriving a word output probability for the reference pattern of the objective word, and for outputting the probability of the most probable objective word corresponding to the input feature vector sequence employing the word output probability and the transition probabilities contained in the respective states of the reference pattern; and recognition result outputting means for outputting one objective word having a corresponding maximum word output probability as a result of recognition of the word on the basis of the word output probabilities obtained by repeating the steps a) through d) for a plurality of different objective words for recognition, wherein the one objective word corresponds to a pattern recognition output result for the input signal.

7. A pattern recognition system as set forth in claim 6, which further comprises features extracting means for transforming the input signal into a feature vector sequence; and feature vector storage means for storing said feature vector.

8. A pattern recognition method as set forth in claim 6, wherein said prediction vector deriving means performs an operation that, when a length of the reference pattern of a length $N_w$ of the objective word for recognition is a sequence of $N_w$ of states, when the n th state of said reference pattern has the control signal vector $c_n^w$, the prediction vector $â_t^w(n)$ is derived as $â_t^w = f(a_{t-1}, c_t^w)$ wherein a dimension of the feature vector is P, a dimension of the control signal vector is Q, and wherein the t−1 th feature vector is $a_{t-1}$.

9. A pattern recognition system as set forth in claim 6, wherein the prediction vector is derived on the basis of one of a linear function and a non-linear function of the t−1 th feature vector and the control signal vector corresponding to the nth state of the reference pattern of the objective word, the linear function being expressed as a matrix relationship, the non-linear function being expressed as a neural network.

10. A pattern recognition system as set forth in claim 9, wherein the non-linear function is expressed using the neural network as a hierarchical network having P+Q inputs and P outputs, P and Q being integers greater than one.

11. A pattern recognition system as set forth in claim 9, wherein the linear function is expressed as a matrix Fij of constants, i and j being integers greater than one, a matrix Gij of constants, and a vector Hi, wherein the linear function is expressed as Fij*xj+Gij*yi+Hi, wherein xj is the t−1 th feature vector and wherein yi is the control signal vector corresponding to the nth state of the reference pattern of the objective word.

* * * * *